US006558216B2

(12) United States Patent
Yerazunis et al.

(10) Patent No.: US 6,558,216 B2
(45) Date of Patent: May 6, 2003

(54) LAND AND WATER BASED FLASH FLOOD DETECTION AND WARNING SYSTEM

(75) Inventors: William S. Yerazunis, Acton, MA (US); Darren L. Leigh, Belmont, MA (US)

(73) Assignee: Mitsubishi Electric Research Laboratories Inc., Cambridge, MA (US)

(*) Notice: Subject to any disclaimer, the term of this patent is extended or adjusted under 35 U.S.C. 154(b) by 0 days.

(21) Appl. No.: 09/973,100

(22) Filed: Oct. 9, 2001

(65) Prior Publication Data

US 2003/0068936 A1 Apr. 10, 2003

(51) Int. Cl.⁷ .............................................. B63B 22/00
(52) U.S. Cl. ........................................................ 441/11
(58) Field of Search ....................................... 441/1, 11

(56) References Cited

U.S. PATENT DOCUMENTS

| | | | | |
|---|---|---|---|---|
| 4,153,881 A | * | 5/1979 | Permut et al. | 327/301 |
| 4,973,947 A | * | 11/1990 | Tax | 200/61.04 |
| 5,283,569 A | * | 2/1994 | Nelson | 340/623 |
| 5,577,942 A | | 11/1996 | Juselis | 441/21 |
| 5,781,117 A | * | 7/1998 | Rish | 200/84 R |
| 5,951,346 A | * | 9/1999 | Woodall, Jr. | 367/4 |
| 6,093,069 A | | 7/2000 | Schelfhout | 441/11 |
| 6,169,476 B1 | | 1/2001 | Flanagan | 340/286.02 |
| 6,261,142 B1 | | 7/2001 | Fiotakis | 441/11 |

OTHER PUBLICATIONS

E. Gruntfest and P. Waterincks, "*Beyond Flood Detection*", Sep. 1998, Prepared under Colorado State University Office of Sponsored Research Contract # 98PG8140373.

J.J. Gourley, "*Multiple Sensor Precipitation Estimation Over Mountainous Terrain*", 1998, Thesis submitted to University of Oklahoma Graduate College School of Meteorology Faculty.

J.J. Gourley et al., "*QPE SUMS and QIWI*", Aug. 14, 2001.

* cited by examiner

*Primary Examiner*—Stephen Avila
(74) *Attorney, Agent, or Firm*—Dirk Brinkman; Andrew J. Curtin

(57) ABSTRACT

A land and water flash flood detecting and warning system includes a buoyant waterproof casing. A detachable tether is externally fixed to the casing and a distal end of the tether is attached to an anchor to secure the casing in place on land. Accelerometers mounted internally to the casing are configured to measure short-range and short-term positional information of the casing when the casing is in water due to flooding of the land. A radio transceiver coupled to the accelerometers transmit the positional information to land based receiving stations to indicate a flooding condition.

15 Claims, 3 Drawing Sheets

LAND AND WATER BASED FLASH FLOOD DETECTION AND WARNING SYSTEM

FIELD OF THE INVENTION

This invention relates generally to systems for detecting and providing early warnings for flooding, and more particularly to detecting flash floods on inland rivers.

BACKGROUND OF THE INVENTION

Communities located along river banks are affected by flooding when a river overflows its banks. For most riverside communities, the height and time at which the river will crest can be predicted well in advance. Although, it may not be possible to prevent property damage, in most cases, loss of lives can be prevented with sufficient advance warning to permit evacuation to higher grounds.

However, for communities located in or near hilly or mountainous regions, flash floods are a particular problem. In fact, flooding is the leading cause of weather related deaths in the United States. Often, the cause of the flood is a sudden severe thunderstorms storm, well upstream in some remote, uninhabited area. In addition, the nature of the terrain will often direct a large amount of water rapidly down a usually narrow water channel. These factors combine to make it difficult to predict the time, location and severity of flash floods.

With water travelling at over fifty kilometers per hour, flash floods can happen in a matter of minutes. The narrow path of danger can cause waves over ten meters high with a very high destructive potential, for example, it is not uncommon for cars and even houses and to be carried far downstream.

Most prior art land-based weather sensing and warning systems are based on simple rain and temperature gauges, Doppler radar, and satellite telemetry. These are generally ineffective for detecting flash floods. Rain gauges only measure continuous precipitation at specific locations. Doppler radar only works well on flat terrain, with big weather features. e.g., frontal systems. If the precipitation is frozen, then Doppler reading can under-estimate by a factor of ten. However, low-level radar coverage is restricted due to beam blockage in mountainous terrain. In addition, radar measurements can be inaccurate. Satellite based detection is only representative of cloud coverage, and not actual precipitation at ground level. All of these require some model that can translate sensed data into predictable flooding conditions. None of these give any real-time indication about the actual state of water flowing through mountainous river beds.

Gourley, "Multiple Sensor Estimation over Mountainous Terrain," Master Thesis, University of Oklahoma, 1998, describes a hybrid system using various types of conventional sensors, and threshold checks. The main use of the system is for after the fact storm analysis. Gourley et al. in "QPE SUMS: Quantitative Precipitation Estimation and Segregation Using Multiple Sensors, Salt River Project," 14, 2001, describe a similar web-based system with a "real-time precipitation algorithm," where multiple sensors are used to measure and detect flash flooding. However, the availability of results, for example, one hour 10 minutes for the Sabino Canyon flash flood of 1998, is still too long to give adequate warning in most situations.

Gruntfest et al. "Beyond Flood Detection: Alternative Applications of Real-Time Data," U.S. Bureau of Reclamation Research Grant #98PG8140373, University of Colorado, 1998, describe the Alert System. There, stream, rain, temperature, barometric, and wind sensors are connected to land based systems, and data are available on the Internet. The report also gives a survey of a large number of flooding alert systems in the United States and the rest of the world.

U.S. Pat. No. 6,169,476 "Early warning system for natural and manmade disasters" issued to Flanagan on Jan. 2, 2001, describes an early warning system for most natural and man made disasters. The system collects and analyzes data in real time as disasters occur, and when necessary, transmit early warnings to cause mitigation responses to lessen the disaster impact on lives and property. The system is designed to determine the type of the disaster, the magnitude, speed, direction, and the expected geographic area to be impacted. Early warnings are transmitted to a wide variety of commonly used consumer and commercial devices. A large number of different types of sensors are discussed, as well as satellite and cellular communications networks, and a central processing system. This system is general purpose, and does not include any component parts specifically designed for flash flood detection and warning.

In the field of oceanography and marine weather forecasting, floating buoys with GPS capabilities are well known for water-based weather monitoring systems. U.S. Pat. No. 5,951,346 "Air-delivered position marking device and method," issued to Woodall, Jr. on Sep. 14, 1999, describes an air-deliverable global positioning system (GPS) position marking device. U.S. Pat. No. 6,093,069 "Low watch circle buoy system," issued to Schelfhout on Jul. 25, 2000, describes a circle buoy system that uses global positioning system (GPS) P(Y) code coordinate sensing and transmission to mark its position in water depths up to 40 feet. The buoy system maintains its position with a flotation unit on the water's surface that transmits signals representative of its location. A submerged unit is affixed to a surface at the bottom of the body of water. Tether lines limit the range or watch circle the flotation unit may traverse on the water.

In these prior art type of weather buoys, the buoys are designed to either monitor weather and sea condition at a fixed oceanic location, or to float freely to measure ocean currents, and sea and weather conditions at various locations. As a characteristic, most water-based systems are designed for large bodies of water such as large lakes and oceans, and not for potentially fast flowing rivers.

It is desired to provide a detection and warning system that can accurately detect flash floods without giving false alarms. The system should be easy to install in hard to reach terrain, and have low maintenance requirements.

SUMMARY OF THE INVENTION

The invention provides a land and water flash flood detecting and warning system. The system includes a buoyant waterproof casing secured to land by a detachable tether and an anchor. Accelerometers mounted internally to the casing are configured to measure short-range and short-term positional information of the casing when the casing is in water due to flooding of the land, and a radio transceiver coupled to the accelerometers transmits the positional information to land based receiving stations to indicate a flooding condition.

The casing is armored and has a smooth elongated ellipsoid shape with a major axis substantially greater than a minor axis. The radio includes short-range and long-rage radio transceivers connected to antennas embedded in the casing, and long-range buoyant antennas attached to the casing. The system can also include temperature, acoustic, and depth sensors coupled to a microprocessor that controls all components of the system. The system can also include a GPS receiver to obtain long-range and long-term positional information.

BRIEF DESCRIPTION OF THE DRAWINGS

FIG. 2a top view of the system of FIG. 1 when located on-land; and

DETAILED DESCRIPTION OF THE PREFERRED EMBODIMENT

System Structure

Figure 1:
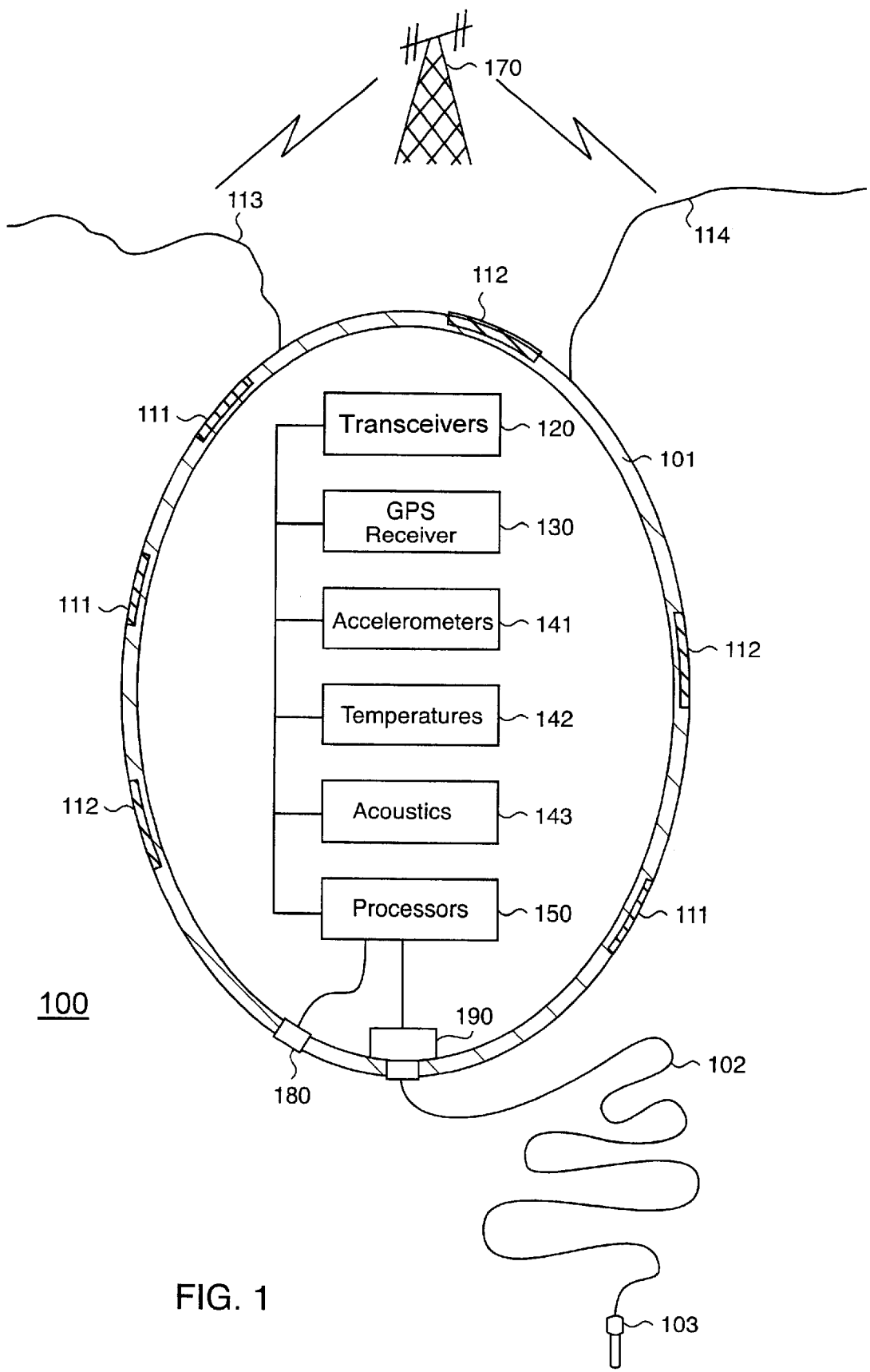
FIG. 1 is a block diagram of a flash flood detector and warning system according to the invention.

As shown in FIG. 1, the invention provides for a land and water based flash flood detection and warning system 100. Normally, the system 100 operates on dry land, however, during severe flooding the system operates in the water. The sensor system 100 has a smooth elongated ellipsoid (egg) shape with a major axis of approximately 1.2 meters and a minor axis of about 0.7 meters, approximately 0.3 cubic meters in volume. The sensor system 100 has an armored, waterproof casing 101, for example, ABS polymer that is about 2.5 centimeters thick. The shape is selected to prevent fouling by other objects that might be floating in the water. Note, this shape is quite different from prior art "can " or "nun" buoys where stability and visibility are of greater concern.

The sensor system 100 is secured to land by a detachable 30 meter by 1.5 cm tether 102 made of a steel cable. The proximate end of the tether 102 is attached to the casing 101, and the distal end is attached to a 2.0 meter mine-grade anchor 103, also known as a roof bolting rod anchor as used in ore mining. Alternatively, a marine type anchor, e.g., a Danforth anchor or grappling hook can be used. The tether 102 is designed to break when the water flow rate exceeds a predetermined threshold, for example, greater than a flood-flow rate of 20 Km/hour. This threshold can be adjusted to take into consideration topography and known expected flooding characteristics.

The shape of the casing 101, the center of mass, and the position of the tether 102 on the casing can be adjusted so that the system 100 will rapidly flutter laterally when it is buoyant in rapidly flowing water, similar to the characteristic movement a fishing lure when pulled rapidly through water. In part, it is this movement that is used to detect a potential flash flood condition.

Multiple radio antennas patches, e.g., eight, are embedded in the casing 101, first antennas 111 are used for receiving GPS signals, and second antennas 112 are used for transceiving cellular radio/telephone signals. The antenna patch pairs 111–112 are arranged so that one pair is always substantially oriented in an upwards direction for any orientation of the sensor system 100. Additionally, there are two 10 meter Kevlar reinforced, buoyant, digital packet radio (7 MHz) antennas 113–114 for long-range packet-radio transceiving mounted on the casing 101. The antennas 111–114 are connected to respective radio transceivers 120 housed inside the casing 100.

The system 100 also includes GPS receivers 130, and sensors 141–143, including six-axis accelerometers 141, temperature sensors 142, and acoustic sensors 143, and possibly depth transducers and flow-rate sensors 180, and a mechanical tether release mechanism 190.

There are three of each component, for redundancy purposes. All these components are connected to multiple redundant microprocessors 150. The components are powered by a 20 Kg. lithium thionyl chloride (Li/SOCl$_2$) non-rechargeable battery, which, under a ~0.7 watt-hour/gram load, has a ten year shelf life at 90% capacity. The above components require about 1400 watt hours per year to give an approximate ten year operational live for the sensor system 100.

Overall, the weight of the sensor system 100, with any required ballast, is about 100 kilograms, and is waterproof to 100 meters, i.e., a pressure of 10 Kg/cm$^2$ with a factor of three buoyancy reserve. It will survive a free-fall of 20 meters onto rock, i.e., 200 Gs, and has an unattended, design lifetime of ten years. The design weight (~100 Kg.) of the system 100 is selected so that it will remain in place when placed on land, and when subject to moderate water flow, such as might be expected during normal spring snow run-off conditions.

System Installation

Figure 2A:
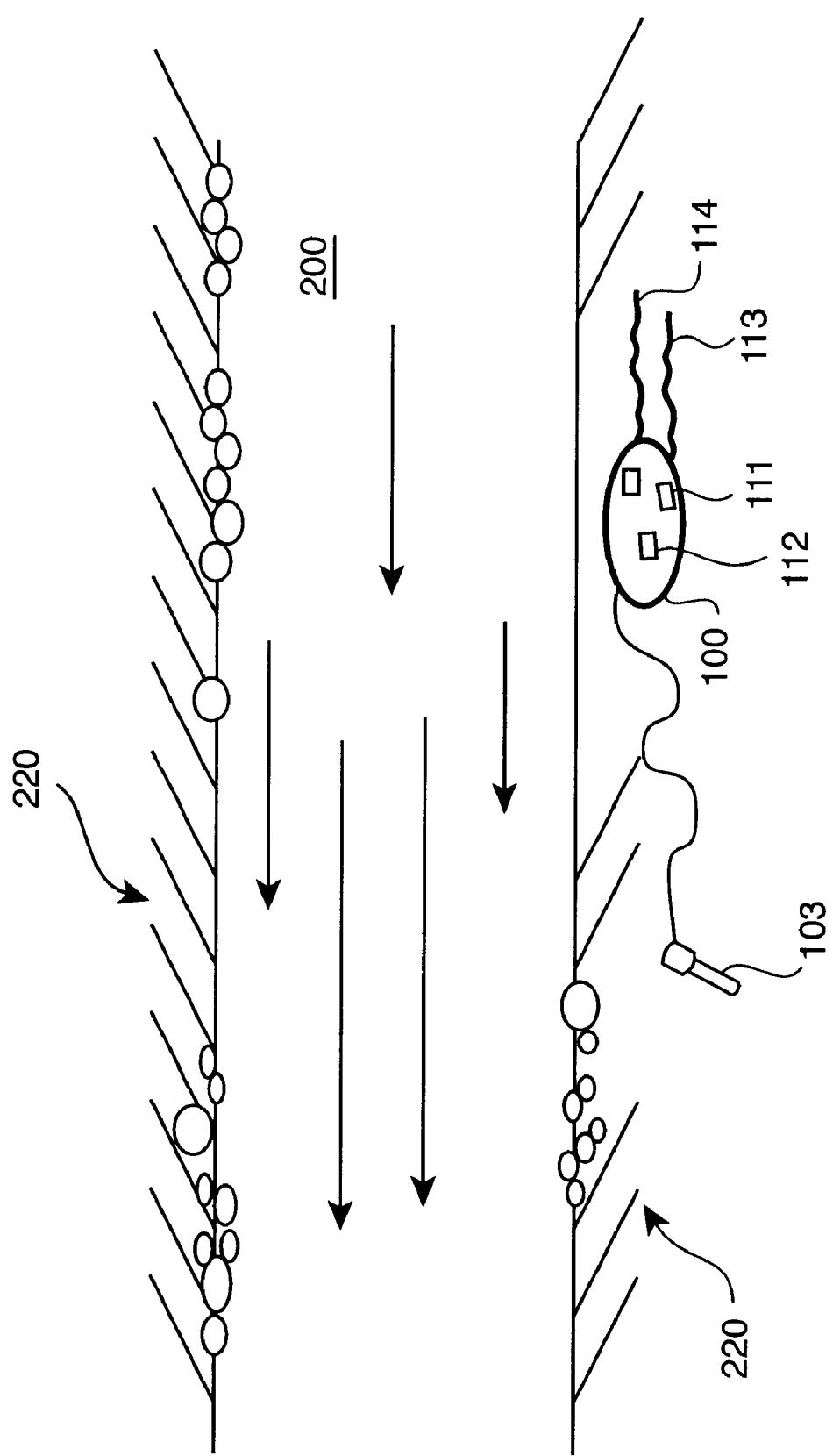

As shown in FIG. 2a for a preferred embodiment, the system 100 is installed on a bank 220 near a river 200 susceptible to flash flooding. Here, the river 200 flows right-to-left. The anchor-bolt 103 can be attached to solid rock. Because of the rugged construction, the system 100 can also be dropped onto the bank 220 or into the river from a hovering helicopter. In this case, a marine anchor is used. In either case, a large number of sensors systems 100 can easily be deployed over a large, hard-to-access geographical area in a fairly short time. Note, wire connections for communication are not required. The system 100 can also be installed in a dry-river bed or run-off wash.

System Operation

During normal operation, partially due to its heavy weight, the sensor system 100 remains fixed in place on land. Therefore, there is no need to transmit signals by the radios 120, other than maybe a periodic signal to indicate that the system 100 is still fully operational. Only under flooding condition will the system 100 shift significantly in position. Two types of positional measurements are considered. The accelerometers 141 measure short term and short range fluctuations in position, while the GPS receivers 130 measures long-term and long range change in position.

Only during flooding will there be any significant change in position. During flooding, the sensor system 100 floats to the surface of the water, typically to some down stream location from the anchor 103. The accelerometers 141 detect any rapid fluctuations in position, and broadcast positional and timing information reflecting this fact. Should the system break free, either because of failure of the anchor to hold, parting of the tether 102 or the release mechanism 190, the GPS receivers can transmit the position and velocity of the system 100 as it floats downstream, see Logsdon, "*The Navstar Global Positioning System,* " Van Nostrand Reinhold, New York, 1992, ISBN 0-422-01040-0; Leick "*GPS Satellite Surveying,* " John Wiley & Sons, New York, 1990, ISBN 0-471-81990-5, Hurn "*GPS—A Guide to the Next Utility,*" Trimble Navigation, Ltd., Sunnyvale, Calif. (1989); Hurn, "*Differential GPS Explained,* Trimble Navigation Ltd., Sunnyvale, Calif, 1993. Depth of water information can also be transmitted. The accelerometers will continue to indicate the level of turbulence in the water flow.

To extend the life time of the system, the components can be placed in lower-power consumption mode when not actually taking measurements or communicating. Also, tilt sensors can be incorporated to activate all components should sudden movement be detected due the system becoming dislodged.

Figure 2B:
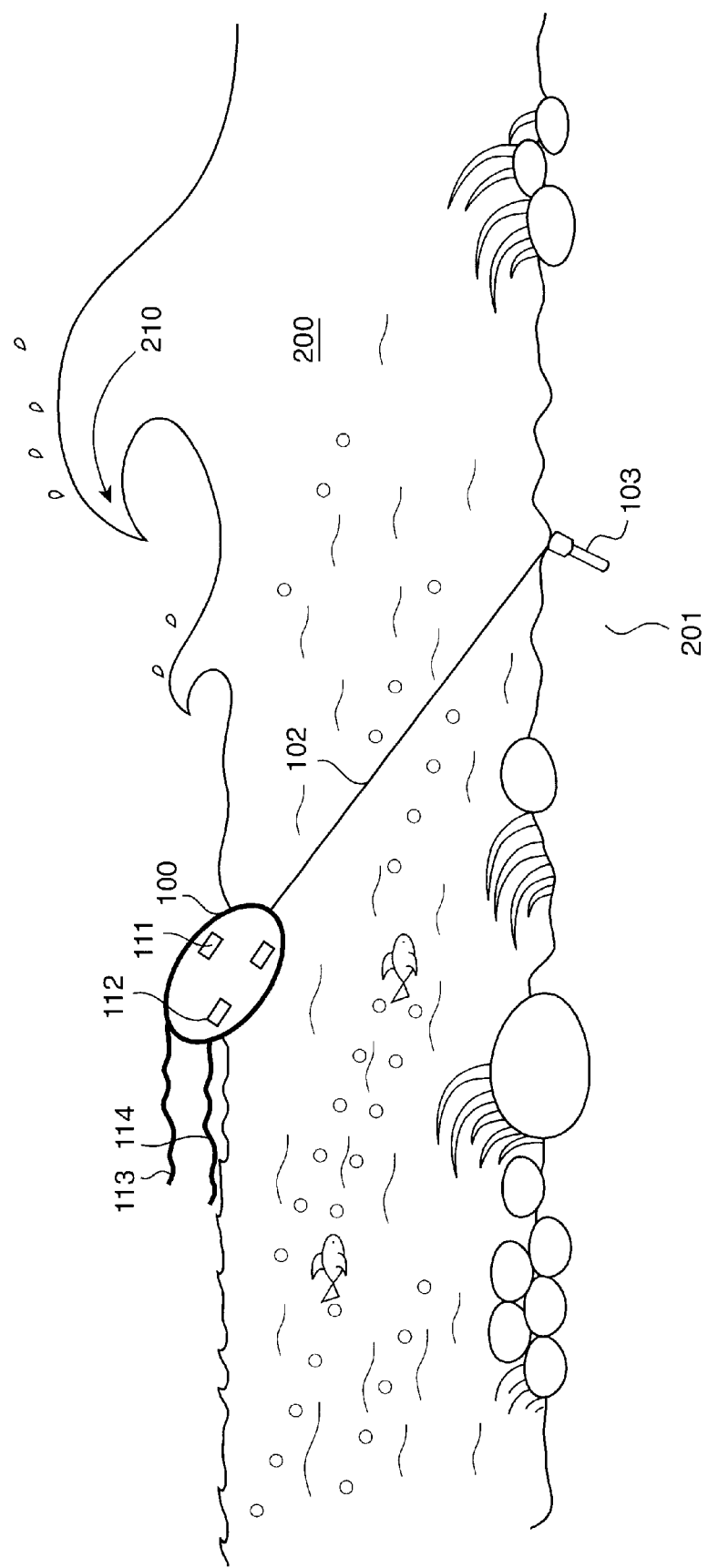
FIG. 2b is a side view of the system of FIG. 1 when located in-water during flash flooding.

FIG. 2b shows the system 100 in the water 200 during flooding. Numeral 210 indicates a flood crest of sufficient severity to cause the system 100 to be carried down stream.

A satellite or base station 170, as shown in FIG. 1, receives the transmitted positional, velocity, and timing information. The base station 170 is coupled to conventional national and local emergency agencies that can forward the warning to the public, for example, by sounding sirens in communities likely to be affected by the flash flood. These agencies can also alert other entities, such as the weather service bureaus, the National Guard, the Red Cross, and so forth.

During the operation, the processor 150 periodically performs self-testing, to ensure that all components are operating properly. The processor can also receive control commands via the transceivers 120, to provide new operating instructions or parameters, or to make other adjustment to the operation of the sensor without direct physical operator contact.

It should be noted that the sensor according to the invention can also be used in regions that are prone to mud slides, pre-earthquake land movement, lava flows, or in mountain lakes. For example, the system according to the invention can be used in a lake whose outflow could possibly be blocked by a rock slide. Because the system has the capability to detect variations in elevation, it is possible to detect any rapid rising in the water level should a slide occur so that preventive measures can be taken. This is particularly useful for remote mountain lakes, where constant on-site observation would be too costly or impossible.

It should also be noted that the operation is not affected by fog, rain, sunlight, darkness, or foliage growth. And, as an advantage, the system is designed to measure conditions inside a flash flood, unlike traditional rain gauges which are stationary and do not indicate actual flow rates. In a severe flood, the tether will break and the buoyant system will continue to measure and broadcast the rate and location of the flood crest as it travels down stream.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A land and water flash flood detecting and warning system, comprising:
   a buoyant waterproof casing;
   a detachable tether externally fixed to the casing having a distal end attached to an anchor to secure the casing in place on land;
   accelerometers mounted internally to the casing and configured to measure short-range and short-term positional information of the casing when the casing is in water due to flooding of the land; and
   a radio transmitter coupled to the accelerometers to transmit the positional information to land based receiving stations.

2. The system of claim 1 wherein the casing has a smooth elongated ellipsoid shape with a major axis substantially greater than a minor axis.

3. The system of claim 1 wherein the casing is armored.

4. The system of claim 1 further comprising:
   short-range and long-range radio transceivers.

5. The system of claim 1 further comprising:
   short-range antenna patches embedded in the casing.

6. The system of claim 1 further comprising:
   long-range buoyant antennas attached to the casing.

7. The system of claim 1 further comprising:
   temperature sensors, acoustic sensors and depth transducers coupled to a microprocessor.

8. The system of claim 1 further comprising:
   a flow rate sensor; and
   a tether release mechanism coupled to the flow rate sensor.

9. The system of claim 1 wherein the tether is detachable at a predetermined flow rate of the water.

10. The system of claim 1 further comprising:
    a GPS receiver to determine long-range and long-term position information of the casing.

11. The system of claim 1 wherein the anchor is a roof bolting rod.

12. The system of claim 1 wherein the anchor is a marine anchor.

13. The system of claim 1 wherein a shape of the casing, a center of mass, and a position of the tether on the casing is adjusted to cause the casing to rapidly flutter laterally when buoyant in rapidly flowing water.

14. A method for detecting and warning of flash-floods, comprising:
    attaching a buoyant waterproof casing to land by a detachable tether externally fixed to the casing;
    measuring short-range and short-term positional information of the casing using accelerometers mounted internally to the casing when the casing is in water due to flooding of the land; and
    transmitting the short-range and short-term positional information of the casing to land based receiving stations.

15. The method of claim 14 further comprising:
    detaching the casing at a predetermined flow rate of the water.

* * * * *